July 5, 1927.
W. S. FISHER
1,634,826
LUBRICATION OF SLEEVE VALVE ENGINES
Filed Oct. 30, 1926     6 Sheets-Sheet 1
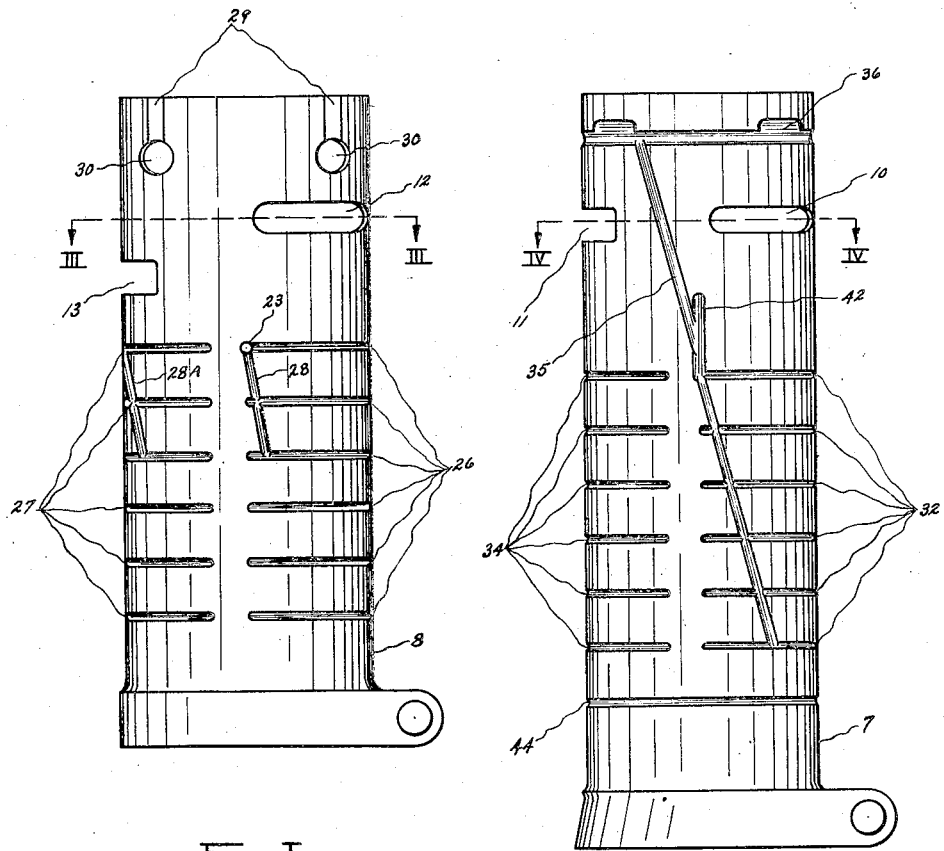
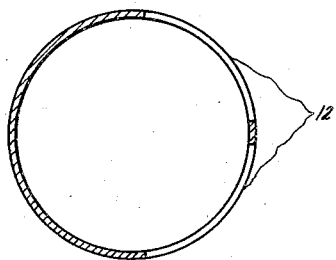
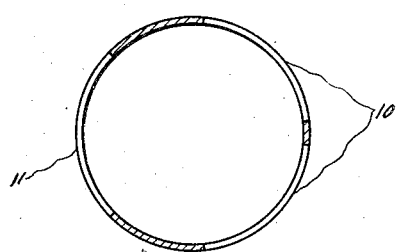
INVENTOR.
WALTER S. FISHER.
BY Solon J. Boughton
ATTORNEY.

July 5, 1927.
W. S. FISHER
1,634,826
LUBRICATION OF SLEEVE VALVE ENGINES
Filed Oct. 30, 1926      6 Sheets-Sheet 2
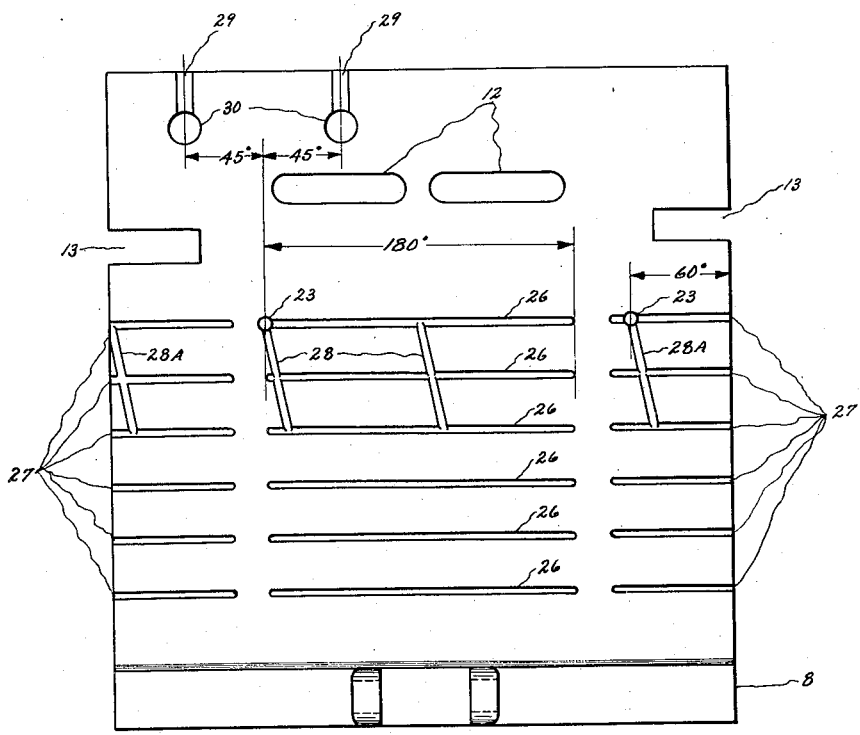
Fig. V.
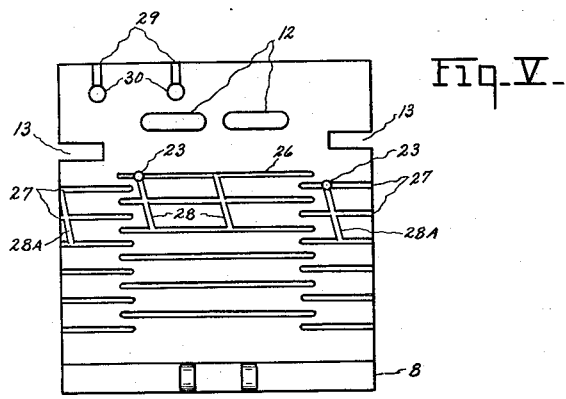
Fig. XIII.
INVENTOR.
WALTER S. FISHER
BY Solon J. Boughton
ATTORNEY July 5, 1927.
W. S. FISHER
1,634,826
LUBRICATION OF SLEEVE VALVE ENGINES
Filed Oct. 30, 1926    6 Sheets-Sheet 3
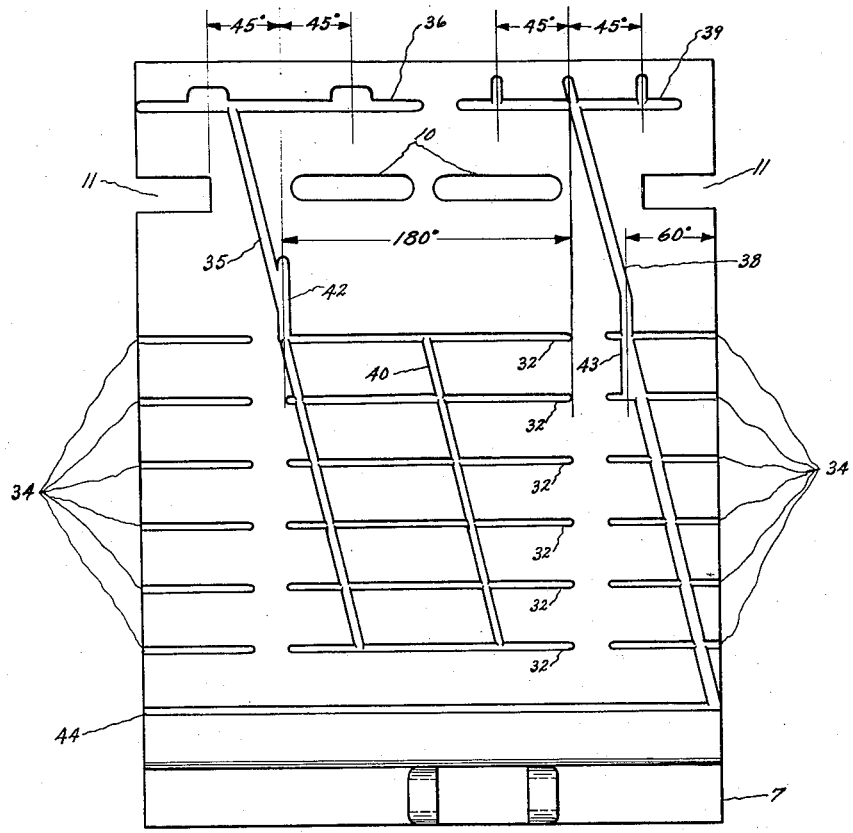
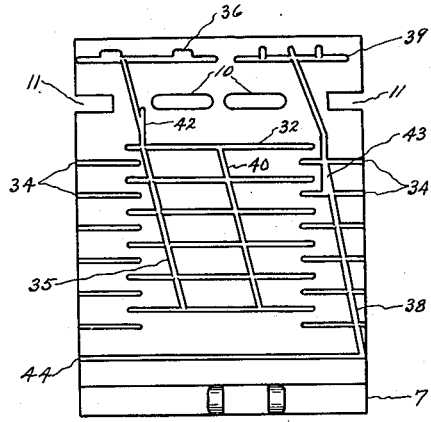
INVENTOR.
WALTER S. FISHER
BY
ATTORNEY.

July 5, 1927.
W. S. FISHER
1,634,826
LUBRICATION OF SLEEVE VALVE ENGINES
Filed Oct. 30, 1926    6 Sheets-Sheet 4
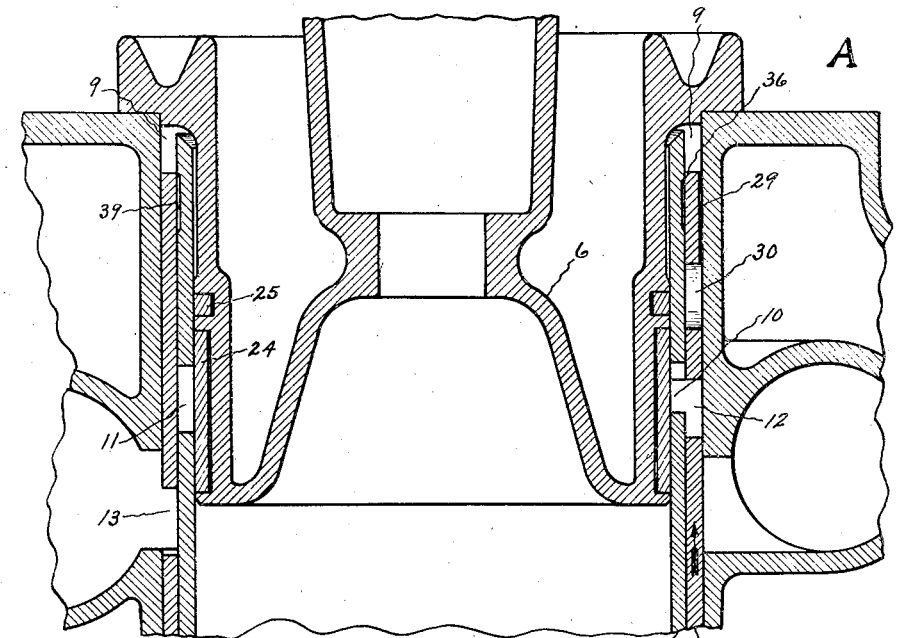
Fig. VII.
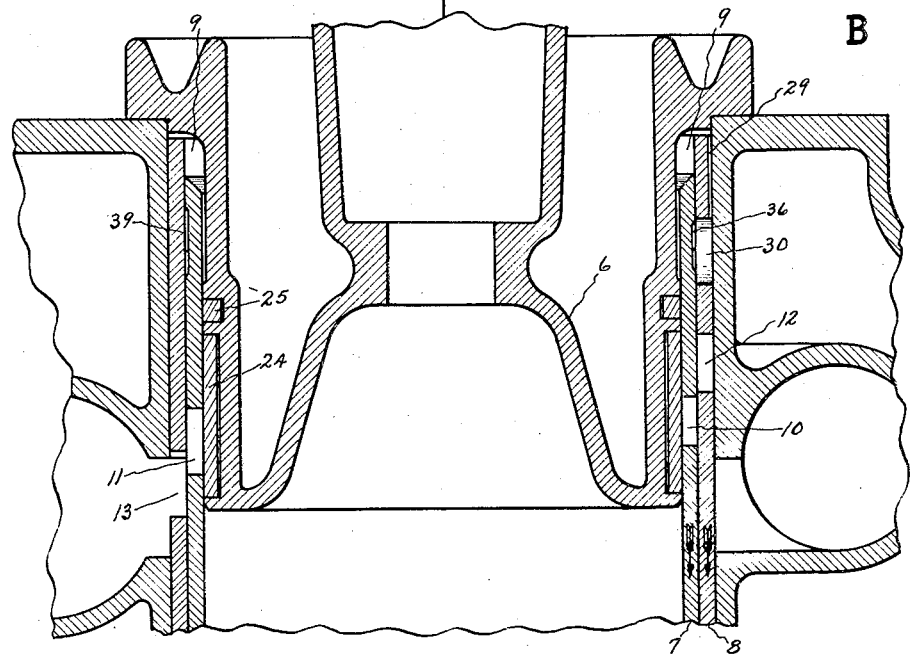
Fig. VIII.
INVENTOR.
WALTER S. FISHER
BY Solon J. Boughton
ATTORNEY.

July 5, 1927.
W. S. FISHER
1,634,826
LUBRICATION OF SLEEVE VALVE ENGINES
Filed Oct. 30, 1926    6 Sheets-Sheet 5
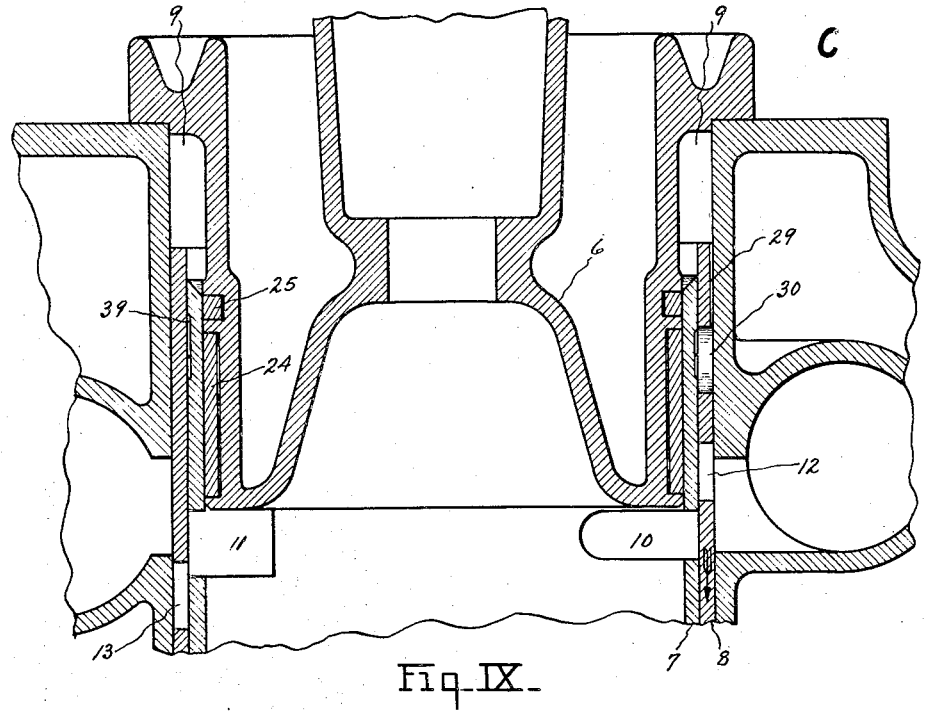
Fig. IX.
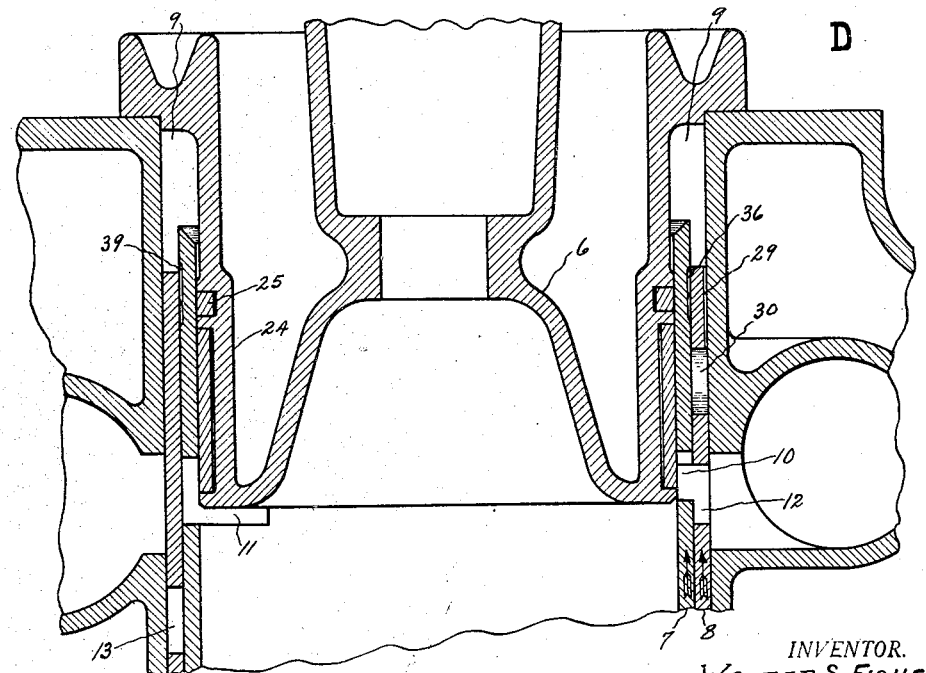
Fig. X.
INVENTOR.
WALTER S. FISHER.
BY Solon J. Boughton
ATTORNEY.

July 5, 1927.
W. S. FISHER
1,634,826
LUBRICATION OF SLEEVE VALVE ENGINES
Filed Oct. 30, 1926
6 Sheets-Sheet 6
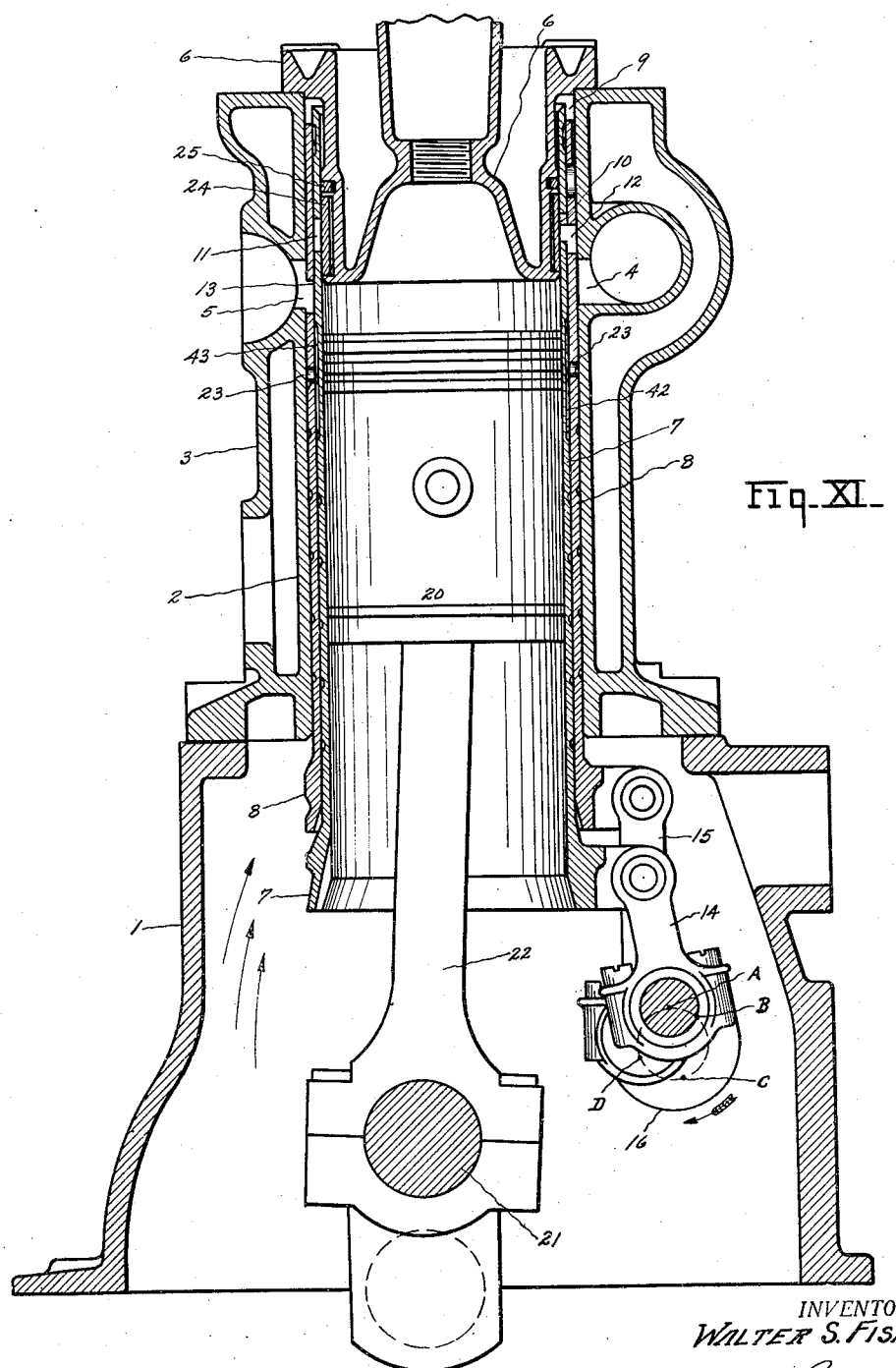
Fig. XI.
INVENTOR.
WALTER S. FISHER
BY Solon J. Boughton
ATTORNEY.

Patented July 5, 1927.

1,634,826

UNITED STATES PATENT OFFICE.

WALTER S. FISHER, OF TOLEDO, OHIO, ASSIGNOR TO THE WILLYS-OVERLAND COMPANY, OF TOLEDO, OHIO, A CORPORATION OF OHIO.

LUBRICATION OF SLEEVE-VALVE ENGINES.

Application filed October 30, 1926. Serial No. 145,301.

This invention relates to internal combustion engines and more particularly to lubrication of sleeve valve engines.

One of the objects of the invention is to provide a means for lubricating a sleeve valve engine by the movement of the sleeves.

Another object of the invention is to provide a means for circulating the oil from the crankcase upwardly on one side of the sleeve and downwardly on the other side.

Another object of the invention is to provide a sleeve valve engine with lubrication passages in the sleeves that will permit the oil to flow past the intake ports with a minimum tendency to enter the ports.

Another object of the invention is to provide an engine sleeve valve in which the oil grooves adjacent the inlet ports carry oil under less pressure than the oil carried by the oil grooves adjacent the exhaust ports.

Other objects will appear from the following description, in conjunction with which, for the purposes of the present application, I have illustrated certain embodiments of the invention in the accompanying drawings in which:

Figure I is a front elevation of an outer sleeve valve embodying my invention.

Fig. II is a front elevation of an inner sleeve designed to cooperate within the outer sleeve for securing the improved lubrication.

Fig. III is a sectional view of the outer sleeve taken on line III—III of Fig. I.

Fig. IV is a sectional view of the inner sleeve taken on line IV—IV of Fig. II.

Fig. V is a development of the outer sleeve showing its outer surface.

Fig. VI is a similar development of the inner sleeve.

Figs. VII to X inclusive are views drawn to a larger scale of portions of a sleeve valve engine showing successive positions of sleeves corresponding to cam shaft positions A, B, C and D of Fig. XI.

Fig. XI is a sectional view through a complete engine substantially bisecting the sleeves showing the relation of the sleeves and their respective grooving.

Figs. XII and XIII are developments of an inner and an outer sleeve respectively, drawn to a smaller scale illustrating a modification of the oil grooving.

The present invention is an improvement over my former invention described in my co-pending application Serial No. 581,607, filed August 14, 1922, in which I have shown a series of annular grooves upon the sleeves that intersect both of the longitudinal grooves. The former invention, although very satisfactory, permitted some of the oil to be short circuited through the annular grooves and to be forced under pressure to those grooves underlying the inlet port.

It is desirable to supply less oil to the sleeves around the inlet ports of Knight type engines than is supplied around the exhaust ports. More oil is required around the exhaust port by reason of the greater heat, but in the ordinary engine the reverse condition is usually encountered, because the exhaust gas pressure forces oil away from the exhaust port, and the suction of the intake stroke tends to draw oil toward the inlet port. The present invention counteracts the natural tendency of the engine and supplies more oil to the exhaust side of the sleeve as may be seen from the description to follow.

Referring to the drawings in which like characters refer to like parts throughout the views, in Fig. XI there is illustrated a sleeve valve engine having an upper crank case section 1 upon which rests a cylinder 2 having a water jacket 3, and inlet and exhaust ports 4 and 5. A cylinder head 6 fits the top of the cylinder and for the most part lies within the upper portion of the cylinder 2, but is spaced therefrom by the inner and outer sleeves 7 and 8, which project into the annular space or cavity 9. The inner sleeve is provided with inlet and exhaust ports 10 and 11 respectively and the outer sleeve with inlet and exhaust ports 12 and 13 respectively, the corresponding ports of which cooperate with one another and with the cylinder ports 4 and 5 to control the intake and exhaust of the engine. Reciprocating motion is imparted to the sleeves 7 and 8 by connecting links 14 and 15, driven by eccentric shaft 16. A piston 20 slides within the inner sleeve and drives the crankshaft 21 through the connecting rod 22. A junk ring 24 and a narrow ring 25, both carried by the cylinder head, make a gas tight joint with the inner sleeve 7.

The outer surface of the outer sleeve 8 is shown provided with a series of lateral oil grooves 26 beneath inlet ports 12, and a similar series of grooves 27 beneath exhaust port 13. Longitudinal grooves 28 and 28^A connect a number of the grooves of each series. I have shown three grooves of each series connected by two longitudinal grooves, but both the number of lateral grooves connected and the number of the longitudinal grooves used may be varied according to the conditions encountered. However, extreme care should be used to not interconnect grooves of the isolated exhaust and inlet series. Apertures 23 are formed in the wall of the sleeve within one groove of each interconnected series, and short grooves 29 having openings 30 through the wall of the sleeve are provided for a purpose hereinafter described.

The inner sleeve 7 has its outer surface provided with a similar isolated series of cross grooves beneath each of the ports, the lateral grooves 32 forming a series beneath the inlet ports 10 and the lateral grooves 34 forming a series beneath the exhaust port 11. Grooves 32 are interconnected by a longitudinal groove 35 which extends upwardly between the ports into a lateral groove 36 above the ports, and grooves 34 are interconnected by a longitudinal groove 38 extending upwardly between the ports into an upper lateral groove 39. Other longitudinal grooves may be added if desired such as groove 40 to better distribute the oil but care should be used to isolate the two series of grooves beneath the respective inlet and exhaust ports. The longitudinal grooves are preferably spirally arranged and short vertical grooves 42 and 43 are provided in position to align with apertures 23 of the outer sleeve 8.

The operation of the parts will now be described. With the engine crankshaft 21 and the eccentric shaft 16 rotating in a clockwise direction, oil is splashed against the lower outer surfaces of the two sleeves, is distributed along the surfaces of the sleeves and finds its way into the oil grooves on the sleeve surfaces. When the eccentric operating the inner sleeve 7 through the link 14 is at position A, the sleeves 7 and 8 are in the position illustrated by Figs. VII and XI, in which position it will be noted the groove 36 of the inner sleeve is out of alignment with the openings 30 of the outer sleeve and the groove 39 in the inner sleeve is covered by the outer sleeve. As the eccentric shaft 16 rotates in a clockwise direction to a new position B the sleeves will have moved to the position indicated by Fig. VIII. In this position the groove 36 has come into register with the openings 30 and a passageway is opened by means of groove 29 from the annular space 9 above the sleeves to the grooves 35 and 32 of the inner sleeve, and by means of groove 42 and aperture 23 to the grooves 26 of the outer sleeve. Since both sleeves have been moving downwardly just prior to their reaching this position a partial vacuum exists in the annular space 9 which draws oil from the grooves 32 and 26 upwardly into space 9. It is desirable to have the upwardly moving oil collected from the grooves beneath the inlet ports, as the sleeves are usually over oiled adjacent the intake ports, and the surplus is frequently drawn through the ports into the engine.

Upon further rotation of the eccentric shaft the inner sleeve moves down relative to the outer sleeve an amount sufficient to cause the groove 36 to pass out of register with the holes 30, but, upon still further rotation the groove 36 again comes into register with the holes 30. This latter position is illustrated by Fig. IX where the eccentric center for link 14 is in the position C, and the inner sleeve 7 is at its lowest position. Oil on the surface of the sleeves is again drawn away from beneath the intake ports as before, until the inner sleeve moves up a sufficient distance to bring the groove 36 out of register with the holes 30. Upon reaching position D as shown in Fig. X, the inner sleeve is sufficiently higher than the outer sleeve to expose the upper end of the groove 39. Both sleeves are moving upwardly and the resulting pressure in the space 9 causes the oil contained therein to flow downwardly through groove 38 toward the bottom of the sleeve, and into the lateral grooves 34 beneath the exhaust port 11. Groove 43 by its alignment with aperture 23 permits the oil under pressure to be forced into the lateral grooves 27 beneath the exhaust port 13 of the outer sleeve 8 and both sleeves are supplied with forced lubrication underneath their exhaust ports. Any surplus oil is delivered directly to the crank case by means of an annular groove 44 on inner sleeve 7 that one period in the cycle is uncovered by the outer sleeve. If desired, both series of grooves on the inner sleeve may extend to the bottom thereof, but I have found that sufficient lubrication is secured by arranging the grooves beneath the inlet port so that they are never uncovered by the outer sleeve, and to make the lowest groove of the exhaust series a complete annular groove.

Further rotation of the eccentric shaft from the D position brings the sleeves back to the position A where the upper ends of both grooves 36 and 39 are covered by the outer sleeve.

If it is desired to have the entire circumference of the surfaces contiguous to the sleeves swept by oil grooves, the grooving shown in Figs. XII and XIII may be used. The operation of the sleeves having the modified grooving is substantially the same as in the preferred form shown in Figs. I to XI inclusive, but the individual grooves of each series are axially displaced relative to each other and their ends interlock as shown in the drawings.

It may easily be seen from the foregoing description that I have provided an internal combustion engine of the Knight type, in which the sleeves act as a pump to circulate the oil, and in which the suction and delivery channels are entirely separated. The majority of engines should have the suction grooving adjacent the intake ports but in some instances it might be found desirable to use a reverse arrangement. Reversal of the grooving is not recommended however, except as a last resort, as it is believed that the amount of oil supplied may be readily governed by increasing or diminishing the size or number of cross grooves that are incommunication with the two main grooves 35 and 38.

I claim as my invention:

1. In an internal combustion engine of the reciprocating sleeve valve type, means forming a passageway for lubricant upward from the engine crank case longitudinally of the sleeves, means forming a passageway for lubricant downward toward the crank case longitudinally of the sleeves, said upward and downward passageways being isolated from each other throughout their length, and means whereby lubricant is caused to circulate within said passageways.

2. In an internal combustion engine of the reciprocating sleeve valve type, a pair of concentric valve sleeves, means forming a pair of passageways extending longitudinally of each sleeve, said passageways of each sleeve being isolated from each other, the outer of said sleeves having apertures therein in communication with each of its passageways, said apertures being each adapted to communicate with an isolated passageway of the inner sleeve and means for causing oil to circulate within said passageways.

3. An internal combustion engine comprising a cylinder, a cylinder head connected therewith at one portion and spaced therefrom at another portion to form an annular cavity, a pair of movable sleeves projecting into said cavity, a pair of isolated lubricant passages in one sleeve, and means on said other sleeve for alternately connecting each of said isolated passages with said cavity.

4. An internal combustion engine comprising a cylinder, a cylinder head connected therewith at one portion and spaced therefrom at another portion to form an annular cavity, a pair of concentric movable sleeves projecting into said cavity, a pair of isolated lubricant passages in each of said sleeves, the outer of said sleeves having apertures therein connecting each of its lubricant passages with a corresponding passage in the inner sleeve, and means on said outer sleeve for alternately connecting each of said inner sleeve passageways with said cavity.

5. An internal combustion engine having inner and outer contiguous valve sleeves, the inner of said sleeves having a pair of isolated longitudinal grooves formed on the face adjacent the outer sleeve, the outer of said sleeves having an opening through its wall adapted to intermittently register with one of said grooves, and said outer sleeve by its relative movement serving to alternately uncover the upper end of one groove, and align its wall opening with the other of said grooves.

6. In an internal combustion engine having inner and outer contiguous valve sleeves, each of said sleeves having a pair of isolated longitudinal grooves formed in their outer faces, said outer sleeve having apertures therein for connecting each of its grooves with corresponding grooves on the inner sleeve, and an opening through its wall adapted to intermittently register with one of said inner sleeve grooves, and said outer sleeve by its relative movement serving to alternately uncover the upper end of one inner sleeve groove, and align said opening with the other of said inner sleeve grooves.

7. In an internal combustion engine having a pair of valve sleeves and means for reciprocating the same, one of said sleeves having a pair of isolated longitudinal grooves on its outer surface, and the other of said sleeves having an opening therein adapted to intermittently register with one of said grooves, said outer sleeve having its top portion adapted to intermittently uncover the top end of said other groove, and walls enclosing the upper ends of said sleeves whereby movement of said sleeves tends to alternately draw lubricant upwardly in one of said grooves and force it downwardly in the other of said grooves.

8. In an internal combusion engine having a pair of valve sleeves and means for reciprocating the same, one of said sleeves having a pair of isolated longitudinal grooves so arranged that when both sleeves move downwardly suction is created above them and that one only of said isolated grooves is opened for lubricant to be sucked therethrough, and when both of said sleeves are moving upwardly the other only of said grooves is opened for lubricant to be forced therethrough.

9. An internal combustion engine having a pair of reciprocating valve sleeves, said sleeves having inlet and exhaust ports on opposite sides thereof, one of said sleeves having a pair of oppositely arranged isolated longitudinal grooves thereon, each of said grooves having interconnecting cross grooves extending laterally therefrom beneath said ports, means for drawing oil upwardly in one longitudinal groove beyond the top of said sleeves and forcing it downwardly in the other of said grooves, and said groove having its cross grooves beneath said inlet port being adapted to carry upwardly-moving oil exclusively.

10. An internal combustion engine having a pair of reciprocating valve sleeves, said sleeves having oppositely arranged inlet and exhaust ports, one of said sleeves having a pair of isolated longitudinal grooves thereon, one of said grooves having interconnecting cross grooves laterally extending beneath said inlet port, means for circulating oil within said grooves upwardly from and downwardly toward the lower end of said sleeves, and said groove having the cross grooves beneath said inlet port arranged to carry upwardly moving oil exclusively.

11. An internal combustion engine having a pair of concentric reciprocating valve sleeves, said sleeves having oppositely arranged inlet and exhaust ports, each of said sleeves having a pair of isolated longitudinal oil grooves thereon, each of said grooves having interconnecting cross passages laterally extending beneath the inlet and exhaust ports respectively, the outer of said sleeves having apertures through its wall interconnecting each isolated groove with a corresponding isolated groove of the inner sleeve, and means for moving oil exclusively upward in the grooves having cross grooves beneath the inlet ports and exclusively downward in the grooves having cross grooves beneath the exhaust ports.

12. An internal combustion engine having a pair of concentric reciprocating valve sleeves, said sleeves having oppositely arranged inlet and exhaust ports, each of said sleeves having a pair of isolated longitudinal oil grooves thereon, one of each pair of said grooves having interconnecting cross grooves extending beneath said inlet ports, apertures through the wall of said outer sleeve interconnecting each isolated groove with a corresponding isolated groove of the inner sleeve, and means for moving oil exclusively upward in the grooves having cross grooves and exclusively downward in the other grooves.

13. A valve sleeve for an internal combustion engine having oppositely arranged inlet and exhaust ports, said sleeve having a pair of isolated longitudinal oil grooves thereon adapted to guide oil therein between said ports.

14. A valve sleeve for an internal combustion engine having oppositely arranged inlet and exhaust ports, said sleeve having a pair of isolated longitudinal oil grooves thereon, one of said grooves having interconnecting cross grooves extending beneath said inlet port.

15. A valve sleeve for an internal combustion engine having oppositely arranged inlet and exhaust ports, said sleeve having a pair of isolated longitudinal grooves therein, each of said grooves having interconnecting cross grooves extending beneath said inlet and exhaust ports respectively.

16. In a Knight engine, a sleeve having therein a longitudinal oil suction groove and having horizontal grooves extending partially around the sleeve connected with said longitudinal groove, said sleeve having also a longitudinal oil discharge groove and separate horizontal grooves communicating therewith, and a second sleeve adapted to open the upper end of said suction groove when the sleeves are moving downwardly and to uncover the upper end of said discharge groove when the sleeves are moving upwardly.

17. In a Knight engine, a sleeve having therein two longitudinal grooves, the lower ends of which are exposed during at least a portion of the engine cycle, a second sleeve comprising means to expose one of said longitudinal grooves to the space above the sleeves during the downward motion of the sleeves and to expose the upper end of the other longitudinal groove during the upward motion of the sleeves, and a series of transverse grooves communicating with each of said longitudinal grooves but entirely separate from each other.

In testimony whereof, I affix my signature.

WALTER S. FISHER.